United States Patent Office 3,781,432
Patented Dec. 25, 1973

---

3,781,432
CORONARO-DILATING AND ANTIANOXEMIC MEDICINES
Roland Yves Mauvernay, Norbert Busch, Jacques Simond, and Jacques Moleyre, Riom, France, assignors to Centre Europeen de Recherches Mauvernay, Riom, France
No Drawing. Continuation of abandoned application Ser. No. 749,277, Aug. 1, 1968. This application Aug. 23, 1971, Ser. No. 174,179
Claims priority, application France, Aug. 3, 1967, 116,738; Mar. 14, 1968, 143,676
Int. Cl. A61k 27/00
U.S. Cl. 424—250      9 Claims

ABSTRACT OF THE DISCLOSURE

A method of treating a patient to produce coronodilation and to provide anti-arhythmic activity, comprising administering to the patient a therapeutically effective dose of a compound having the formula $$R-O-CH_2-CH-CH_2-A$$
$$|$$
$$O-C-R_1$$
$$\|$$
$$O$$

wherein

R is alkyl with 1 to 5 carbon atoms, alkenyl, alkynyl, phenyl, a nitro substituted phenyl, or arylalkyl,
$R_1$ is phenyl, methoxyphenyl, pyridyl, furyl, arylalkyl, or arylalkenyl,
A is morpholyl, N-methylpiperazinyl, or N-benzylpiperazinyl.

CROSS-RELATED APPLICATIONS

This application is a continuation of copending application Ser. No. 749,277, filed Aug. 1, 1968 and now abandoned.

This invention relates to novel class of chemical compounds, useful for their coronaro-dilating and antianoxemic properties, as well as for their antiarhythmic and local anesthetic properties.

The value of these compounds lies in the fact that the previously mentioned properties do not result from a B-blocking action and are not accompanied by any hypotensive activity.

It is known that aminopropanediol derivatives, having the general formula $$R-O-CH_2-CH-CH_2-A \quad (I)$$
$$|$$
$$OH$$

in which R is an aryl radical which may be substituted, or in particular, a branched aliphatic radical, A is a secondary or tertiary amine radical in which the amine nitrogen carries one or two alkyl substituents, the secondary alcohol function being free in all cases, have a more or less pronounced antiarhythmic action. However, these same known compounds have a B-blocking effect, which results, in addition to this antiarhythmic and coronaro-dilating action, in hypotensive activity which is not desired in medicines of ths itype.

A search was therefore undertaken for compounds with a similar structure, possessing antiarhythmic and coronaro-dilating action which would not result fro mthis B-blocking effect and not be coupled with any hypotensive activity.

It has been noted, in the first place, that amino-alcohol having the above-mentioned Formula I but in which R is an alkyl, alkenyl, alkynyl, arylalkyl, or aryl radical with A being a tertiary amine group in a heterocycle, the secondary alcohol function remaining free, have practically no available therapeutic activity on the cardiovascular system.

On the other hand, it has been noted unexpectedly, in this latter class of compounds, that if the secondary alcohol function is esterified, a novel class is obtained in which all the members possess remarkable coronaro-dilating and antiarhythmic properties and are completely free of beta-blocking and hypotensive effects.

This class can therefore be defined by the general formula:

$$R-O-CH_2-CH-CH_2-A$$
$$|$$
$$O-C-R_1$$
$$\|$$
$$O$$
$$(II)$$

in which R is a substituted or unsubstituted alkyl, alkenyl, alkynyl, aryl or arylalkyl radical, A is a tertiary amine group in a heterocycle, $R_1$ is a ring substituted or unsubstituted aromatic radical, or an arylalkyl radical, and stands also for the pharmaceutically acceptable acid addition salts of these compounds.

Listed in Table I below are a certain number of these compounds with their melting points.

TABLE I

| Compound number | R | $R_1$ | A | Salts (F., ° C.) |
|---|---|---|---|---|
| 4 | $CH_3-CH_2-CH_2-CH_2$ | 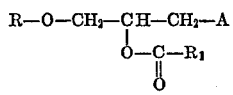 | -N N-CH₃ | Difumarate (193°). |
| 5 | $CH_2=CH-CH_2-$ | 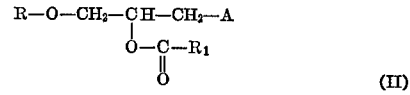 | Same as above | Dichlorhydrate (146°). |
| 6 | CH₃\CH-CH₂-/CH₃ | Same as above | do | Dichlorhydrate (186°). |
| 7 | CH₂\CH-CH₂-CH₂/CH₃ | do | -N O | Dichlorhydrate (105°). |
| 8 | CH₃\CH-CH₂/CH₃ | CH₃O-⟨OCH₃⟩-OCH₃ | Same as above | Chlorhydrate (140°). |

TABLE I—Continued

| Compound Number | R | R₁ | A | Salts (F., °C.) |
|---|---|---|---|---|
| 9 | (CH₃)(CH₃)CH—CH₂ | C₆H₅—CH(C₂H₅)— | —N(morpholine)O | Chlorhydrate (120°). |
| 10 | φ— | 3,4,5-trimethoxyphenyl | Same as above | Chlorhydrate (142°). |
| 11 | (CH₃)(CH₃)CH—CH₂—CH₂— | C₆H₅—CH(OCOCH₃)— | —N(morpholine)O | Chlorhydrate (134°). |
| 12 | φ— | Same as above | Same as above | Chlorhydrate (125°). |
| 13 | φ—CH₂— | 3,4,5-trimethoxyphenyl | —N(morpholine)O | Fumarate (130°). |
| 14 | Same as above | pyridyl | Same as above | Fumarate (147°). |
| 15 | do | furyl | do | Fumarate (130°). |
| 16 | O₂N—φ— | 3,4,5-trimethoxyphenyl | —N(piperazine)N—CH₃ | Fumarate (120°). |
| 17 | Same as above | pyridyl | —N(morpholine)O | Chlorohydrate (145°). |
| 18 | do | furyl | Same as above | Chlorohydrate (145°). |
| 19 | φ—CH₂— | 3,4,5-trimethoxyphenyl | —N(piperazine)N—CH₃ | Dichlorohydrate (165°). |
| 20 | Same as above | pyridyl | Same as above | Trichlorhydrate (145°). |
| 21 | do | furyl | do | Dichlorohydrate (140°). |
| 22 | (CH₃)(CH₃)CH—CH₂—CH₂— | C₆H₅—CH=CH— | —N(morpholine)O | Chlorhydrate (120°). |
| 23 | φ—CH₂— | Same as above | —N(piperazine)N—CH₃ | Dichlorohydrate (130°). |
| 24 | HC≡C—CH₂— | 3,4,5-trimethoxyphenyl | —N(morpholine)O | Chlorhydrate (140°). |
| 25 | Same as above | Same as above | —N(piperazine)N—CH₃ | Dichlorohydrate (150°). |
| 26 | do | pyridyl | —N(morpholine)O | Fumarate (130°). |

The compounds according to the invention are prepared by esterifying the amino-alcohols of Formula I in which R and A have the meanings according to the invention, by means of the acid chloride corresponding to the meaning of $R_1$, in benzene medium and in the presence of a tertiary amine, preferably triethylamine.

These amino-alcohols can themselves be obtained from epichlorohydrin, for example, using one of two methods described below.

METHOD A

An excess of epichlorohydrin is reacted with an alcohol in the presence of $BF_3$ etherate, according to the method given by A. Gauthier, M. Miocque, Fauran and Douzon, B.S.C.F., 3190 (1967); the 3-R-oxy, 2-hydroxy, 1-chloro propanes are obtained. The latter, when treated with NaOH, give the corresponding expoxides and when reacted with a secondary amine, lead to the desired amino-alcohols.

METHOD B

In cases where R is a phenyl group, the phenol corresponding to R is treated with epichlorohydrin in alkaline medium to obtain the 3-phenoxy, 1,2-epoxypropanes, and from this point on, Method A is used.

As examples, the processes for the preparation of some of the compounds according to the invention are given below, using, respectively, Method A for Examples 1, 2 and 3 and Method B for Example 4.

EXAMPLE 1

Snythesis of 4 - [3 - isoamyloxy, 2-(3,4,5-trimethoxy) benzoyloxy]propyl tetrahydro 1,4-oxazine hydrochloride (Compound No. 1)

1st step: 3-isoamyloxy 1,2-epoxypropane.—To a mixture of 176 g. (2 M) of isoamyl alcohol and 4 ml. of a 10% solution of $BF_3$ in anhydrous ether, were added, with stirring, 278 g. (3 M) of epichlorohydrin while maintaining the temperature at approximately 45° C. After the addition, the reaction was maintained for an additional hour at 60° C. It was then cooled and a solution of 160 g. of NaOH in pellets in 200 ml. $H_2O$ was added while maintaining the temperature at approximately 15° C. Stirring was continued for an additional 2 hours, the NaCl formed was filtered and the organic phase decanted.

Vacuum fractionation gave 142 g. of product.
B.P.$_{11}$=67–68° C.
$n_D^{24}$=1.4195.

2nd step: 4-[3-isoamyloxy 2-hydroxy]propyl tetrahydro 1,4-oxazine.—To a solution of 115.2 g. (0.8 M) of epoxide obtained in the preceeding step, in 200 ml. of absolute ethanol, were added 76 g. of morpholine. The temperature rose to approximately 40° C. Heating under reflux was continued for one additional hour, the solvent was distilled and the reaction mixture vacuum fractionated to obtain 166 g. of product.
B.P.$_{13}$=163° C.
$n_D^{21}$=1.4620.
Yield=90%.

3rd step: 4-[3-isoamyloxy, 2-(3,4,5-trimethoxy)benzyloxy]propyl tetrahydro 1,4-oxazine hydrochloride.—In a 2 liter three-neck flask, provided with a tight-fitting stirrer and a reflux condenser, were charged:

115.5 g. (0.5 M) of 4-[3-isoamyloxy, 2-hydroxy]tetrahydro 1,4-oxazine
750 ml. of anhydrous benzene
50.5 g. of triethylamine and
115.25 g. of (3,4,5-trimethoxy) benzoyl chloride.

The mixture was slowly brought to reflux, which was maintained for 4 hours. After cooling, it was filtered, the solvent was stripped off under vacuum, the residue taken up in 4 N HCl (in the cold) and the aqueous solution washed with ether. The aqueous solution was then treated with $Na_2CO_3$ and the oil formed extracted with ether. It was dried over anhydrous $Na_2SO_4$ and the solvent stripped off to obtain a highly viscous oily residue which was taken up in 600 ml. of ethyl acetate; the required quantity of absolute ethanol, with 30% HCl gas, was then added, affording the hydrochloride. After standing for several hours in the ice-box, it was filtered, and after recrystallization from anhydrous isopropyl alcohol and drying under vacuum at 60° C. to constant weight, 155 g. of product were obtained.
Yield=67%.
M.P.=145° C.
Cl$^-$ calculated=7.67%; N calculated =3.01%. Cl$^-$ found=7.66%; N found=3.01%.

White crystalline powder, soluble in water and alcohol, very slightly soluble in ethyl acetate.

EXAMPLE 2 (METHOD A)

Synthesis of 4-[3-propargyloxy, 2-(3,4,5-trimethoxy) benzoyloxy]propyl tetrahydro 1,4-oxazine hydrochloride (Compound No. 24)

(1) 3-propargyloxy, 2-hydroxy, 1-chloropropane was prepared by adding 92.5 g. of epichlorohydrin (1 M) to a mixture of 168 g. of propargyl alcohol (3 M) and 5 ml. of a 5% solution of $BF_3$ in anhydrous ether, with stirring and while maintaining the temperature at 40° C. Stirring was continued for an additional hour at room temperature, 10 ml. of water were added, the organic phase separated and vacuum fractionated to obtain 110 g. of product.
B.P.$_{.13}$=103° C.
Yield=75%.

(2) This product was then ttreated with NaOH to obtain the corresponding epoxide:

To 148.5 g. (1 M) of 3-propargyloxy, 2-hydroxy, 1-chloropropane, were added 52 g. of NaOH in pellets in 100 ml. $H_2O$ while maintaining the temperature at 0° C. The reaction mixture was stirred for 2 hours, the NaCl formed filtered and the organic phase decanted. After vacuum fractionation, 90 g. of product were obtained:
B.P.$_{.7}$=54° C.
$n_D^{27°}$=1.440.
Yield=81%.

(3) This epoxide was treated with morpholine to obtain 4-(3-propargyloxy, 2-hydroxy)propyl tetrahydro 1,4-oxazine under the following conditions:

To a solution of 66 g. (0.5 M) of epoxide in 100 ml. of absolute ethanol were added 48 g. (0.55 M) of morpholine; the temperature rose to approximately 40° C. and the reaction mixture was heated for one hour under reflux. After evaporation of the alcohol, the reaction mixture was vacuum fractionated to afford 75 g. of product:
B. P. $_2$=116–117°
$n_D^{26°}$=1.486.
Yield=70%.

(4) This was then esterified using (3,4,5-trimethoxy) benzoyl chloride to obtain the title product in the following manner:

To a solution of 25.1 g. (0.1 M) of the previously prepared amino-alcohol in 150 ml. of anhydrous benzene and 15 ml. of triethylamine, were added, portionwise, 23 g. (0.1 M) of the finely ground acid chloride. The reaction mixture was then heated under reflux, with stirring, for 3 hours, the benzene solution washed with water, the solvent stripped off under vacuum, the residue taken up in ethyl acetate and absolute ethyl alcohol with HCl gas was added to obtain the hydrochloride as a white crystalline, water and alcohol soluble powder.
M.P.=150°.
HCl calculated =8.45%. HCl found=8.30%.

EXAMPLE 3 (METHOD A)

Synthesis of 4-[3-benzyloxy, 2-(3,4,5-trimethoxy)benzoloxy]propyl tetrahydro 1,4-oxazine fumarate (Compound No. 13)

This product was prepared according to the synthesis described for Compound No. 24 in Example 2 above, except that steps (1) and (2) were combined into a single one, due to the fact that it was not necessary, in this case, to isolate 3-benzyloxy, 2-hydroxy, 1-chloropropane and that the corresponding epoxide was prepared directly in the following manner:

(1) To a mixture of 216 g. (2 M) of benzyl alcohol and 4 ml. of a 10% solution of $BF_3$ in anhydrous ether, were added, with stirring, 278 g. of epichlorohydrin while maintaining the temperature at approximately 45° C. After the addition, it was maintained for an additional hour at 60° C. It was then cooled and a solution of 160 g. of NaOH in pellets in 200 ml. $H_2O$ was added.

After filtration, the organic phase was decanted and vacuum fractionated to afford 140 g. of 2-benzyloxy, 1,2-epoxypropane.

B.P.$_{12-13}$=122–125° C.
$n_D^{21°}$=1.5150.

(2) Proceeding as in step (3) for the synthesis of Compound No. 24 in Example 2 above, 85 g. of the corresponding amino-alcohol were obtained from 82 g. of epoxide and 48 g. of morpholine.

B.P.$_{.3}$=164° C.
$n_D^{23°}$=1.5234.
Yield=68%.

(3) Esterification using 3,4,5-trimethoxy benzoyl chloride was carried out in a manner similar to that described for the compound in Example 2. The fumarate was isolated, in this case, which, after recrystallization from absolute alcohol gave a white crystalline, water soluble powder.

M.P.=130° C.
Fumaric acid calculated=20.6%. Fumaric acid found=21%.

EXAMPLE 4 (METHOD B)

Synthesis of 4-[3-(4-nitro)phenoxy, 2-nicotinoyloxy]propyl tetrahydro 1,4-oxazine hydrochloride (Compound No. 17)

(1) 3-(4-nitro)phenoxy, 1,2-epoxypropane was first prepared:

A mixture of 185 g. (2 M) of epichlorohydrin, 139 g. of para-nitrophenol (1 M), 40 g. of NaOH in pellets in 320 ml. $H_2O$ was heated for 4 hours at 60° C. with stirring. The organic phase was decanted and crystallized from benzene. The product was recrystallized from 96° alcohol. M.P.=58–60° C.

110 g. of epoxide were obtained (yield=60%).

(2) The amino-alcohol was obtained as in steps (2) and (3) in the syntheses described for Compound No. 24 in Example 2 and Compound No. 27 in Example 3.

Thus, 120 g. of 4-[3-(4-nitro)phenoxy, 2-hydroxy] propyl tetrahydro 1,4-oxazine were obtained from 98 g. of epoxide and 48 g. of morpholine:

M.P.=89–90° C.
Yield=85%.

(3) Esterification with nicotinoyl chloride was carried out as in the preparation of compounds in the previous examples.

Thus, the corresponding hydrochloride was isolated as a white crystalline water and alcohol soluble powder.

M.P.=145° C.
HCl calculated=8.7%. HCl found=8.8%.

As indicated at the outset, these compounds possess coronaro-dilating and antiarhythmic activity, with no accompanying hypotensive effect. This set of properties is illustrated in Table II below, in which results from tests carried out on dogs according to the following test method, have been collected:

The thorax was opened, under chloralose, by resection of the fifth right rib. A restraint gauge was sewn onto the right ventricle. Through an opening made in the right auricle, a catheter, having as large a diameter as possible, was introduced into the coronary sinus and was held in place through a ligature placed very near the auricle.

The coronary venous blood flowed into a spirometer, itself placed in a thermostatic tank, and then, without leaving this enclosure came into contact with a macro oxygen electrode (Beckman). It finally returned to the right jugular vein through a tube into which was inserted a fine catheter shunting blood over to a Technicon automatic analyzer where continuous determinations were carried out for total carbon dioxide and ammonia. Myocardium contractions, the $D_2$ electrocardiogram, integrated coronary flow, blood pressure and $PO_2$ were recorded on a Beckman dynograph.

In this testing, the products were administered by the venous route (external saphenous vein) as a slow injection over a 1 minute period.

The table comprises also, the acute toxicity values for the compounds studied, which were evaluated using the Behrens & Karber method (Arch. F. Exp. Path. Pharm., 177, 379, 1935).

TABLE II

| Compound No. | $LD_{50}$, mg./kg. (P.O.) | Doses, mg./kg. (I.V.) | Coronary flow, percent | Frequency, percent | Blood pressure, percent | Ventricular restraint, gauge percent | $PO_2$ |
|---|---|---|---|---|---|---|---|
| 1 | >2,000 | 5 | ↑ 34.6 | ↑ 4 | ↑ 3.2 | ↓ 11.2 | ↑ 59.4 |
| 2 | 1,250 | 5 | ↑ 55 | ↑ 2 | ↓ 29 | ↑ 43.5 | ↑ 35 |
| 3 | 2,000 | 2 | ↑ 28.6 | ↓ 25.3 | ↓ 56 | ↓ 24 | ↑ 38.5 |
| 4 | >3,000 | 5 | ↑ 42 | ↑ 4 | ↓ 2.7 | ↑ 23.5 | ↑ 58 |
| 5 | 1,500 | 2 | ↑ 49.6 | ↓ 21 | ↓ 28.2 | ↓ 24 | ↑ 118 |
| 6 | 3,000 | 5 | ↑ 48 | ↓ 89 | ↓ 40 | ↓ 18 | ↑ 88 |
| 7 | >300 | 5 | ↑ 27.1 | ↑ 1.6 | ↑ 4.2 | ↓ 14.5 | ↑ 37 |
| 8 | >300 | 5 | ↑ 45 | ↑ 11 | ↑ 8.6 | ↓ 5 | ↑ 31 |
| 9 | >300 | 5 | ↑ 13 | ↑ 1.6 | ↑ 5.6 | ↓ 18 | ↑ 31 |
| 10 | >300 | 5 | ↑ 55 | ↑ 1.5 | ↓ 13 | ↓ 5 | ↑ 65 |
| 11 | >300 | 5 | ↑ 60.6 | ↓ 8.4 | ↑ 4.6 | ↓ 16.6 | ↑ 35.4 |
| 12 | >150 | 5 | ↑ 23.3 | ↓ 19.8 | ↑ 6.8 | ↓ 17.3 | ↑ 29.5 |
| 13 | >3,000 | 5 | ↑ 66 | ↑ 3.3 | ↓ 6.5 | ↓ 14.7 | ↑ 70 |
| 16 | 3,000 | 5 | ↑ 64 | ↓ 13 | ↑ 44.5 | ↑ 10 | ↑ 92 |
| 17 | >3,000 | 5 | ↑ 10 | ↓ 16.5 | ↑ 8.5 | ↓ 25.5 | ↑ 14.5 |
| 19 | 3,000 | 5 | ↑ 138.5 | ↑ 7 | ↓ 28 | ↑ 5.5 | ↑ 127.5 |
| 20 | >3,000 | 5 | ↑ 52 | ↑ 24.5 | ↓ 1 | ↑ 39 | ↑ 12.5 |
| 21 | | 5 | ↑ 11 | ↑ 17 | ↓ 0.6 | ↑ 4.3 | ↓ 7 |
| 24 | 3,000 | 5 | ↑ 30.2 | ↑ 16.6 | ↓ 13.3 | ↑ 12 | ↑ 37.5 |
| 25 | 1,000 | 5 | ↑ 143.5 | ↑ 1.5 | ↓ 27.9 | ↑ 23.5 | ↑ 2.5 |
| 26 | >3,000 | 5 | ↑ 17 | ↓ 6.5 | ↑ 9 | ↓ 11 | ↑ 12 |

These products can be administered:

orally, as tablets, capsules, soluble granules, drops, syrup,
rectally, as suppositories or rectal capsules,
as injections, in the form of bottles of lyophilized powder or ampoules, associated with the vehicles usually employed in such preparations.

The doses used are summarized in the following Table III:

TABLE III

| Routes of administration | Unit doses, mg. | Preferred doses, mg. |
|---|---|---|
| Oral | 50-100 | 75 |
| Injectable | 50-500 | 250 |
| Rectal | 100-200 | 100 |

What is claimed is:

1. A method of treating a patient to produce coronodilation and to provide anti-arhythmic activity, said method comprising administering to said patient, a therapeutically effective dose of a compound having the formula:

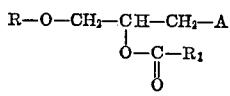

wherein
R is alkyl with 1 to 5 carbon atoms, alkenyl, propargyl, phenyl, p-nitrophenyl, or benzyl,
$R_1$ is phenyl, 3,4,5-trimethoxyphenyl, pyridyl, furyl, benzyl, ethylbenzyl, acetoxybenzyl or styryl, and
A is morpholyl, N-methylpiperazinyl, or N-benzylpiperazinyl.

2. A method as claimed in claim 1 wherein the compound has the formula:

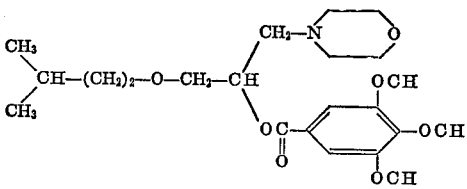

3. A method as claimed in claim 1 wherein the compound has the formula:

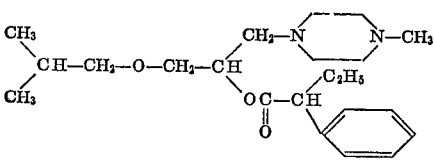

4. A method as claimed in claim 1 wherein said dose is administered orally in an amount of 50 to 100 mg.

5. A method as claimed in claim 4 wherein the amount is 75 mg.

6. A method as claimed in claim 1 wherein said dose is administered by injection in an amount of 50 to 500 mg.

7. A method as claimed in claim 6 wherein the amount is 250 mg.

8. A method as claimed in claim 1 wherein said dose is administered rectally in an amount of 100 to 200 mg.

9. A method as claimed in claim 8 wherein the amount is 100 mg.

References Cited

UNITED STATES PATENTS

| | | | |
|---|---|---|---|
| 3,448,200 | 6/1969 | Stoll | 424—329 |
| 3,394,171 | 7/1968 | Thompson et al. | 260—501.18 |
| 3,379,761 | 4/1968 | Wilhelm | 260—570.7 |

STANLEY J. FRIEDMAN, Primary Examiner

U.S. Cl. X.R.

424—248, 308, 311, 329, 330